United States Patent [19]

Shigemasa

[11] Patent Number: 4,679,136

[45] Date of Patent: Jul. 7, 1987

[54] DYNAMIC ERROR COMPENSATING PROCESS CONTROLLER

[75] Inventor: Takashi Shigemasa, Yokohama, Japan

[73] Assignee: Kabushiki Kaisha Toshiba, Kawasaki, Japan

[21] Appl. No.: 690,259

[22] Filed: Jan. 10, 1985

[30] Foreign Application Priority Data

Apr. 13, 1984 [JP] Japan .................................. 59-73982
Apr. 13, 1984 [JP] Japan .................................. 59-73983
Apr. 13, 1984 [JP] Japan .................................. 59-73984

[51] Int. Cl.$^4$ ...................... G05B 13/04; G05B 13/02; G05B 13/00
[52] U.S. Cl. ................................... 364/150; 364/151; 364/162; 318/561
[58] Field of Search ............... 364/150, 151, 153, 157, 364/159, 162, 161, 179; 318/561, 563, 565, 624

[56] References Cited

U.S. PATENT DOCUMENTS

| | | | |
|---|---|---|---|
| 4,054,780 | 10/1977 | Bartley et al. | 364/150 |
| 4,151,587 | 4/1979 | Bénéjean | 364/150 |
| 4,195,337 | 3/1980 | Bertrand et al. | 364/151 |
| 4,407,013 | 9/1983 | Cercama et al. | 364/162 |
| 4,451,878 | 8/1984 | Shigemasa | 364/151 |
| 4,509,110 | 4/1985 | Levesque et al. | 364/150 X |
| 4,539,633 | 9/1985 | Shigemasa | 364/162 |
| 4,546,426 | 10/1985 | Häfner et al. | 364/157 |
| 4,563,734 | 1/1986 | Mori et al. | 364/150 X |
| 4,587,470 | 5/1986 | Yamawaki | 364/162 |
| 4,607,326 | 8/1986 | Mori et al. | 364/157 |

OTHER PUBLICATIONS

Proceedings of the International Federation of Automatic Control, Proceeding 6: 6th World Congress, Boston, US, Aug. 24–30, 1975; pp. 1–9, Instrument Society of America, Pittsburgh, US; B. Courtiol.
Theory and Applications of Adaptive Control–A Survey–; Automatica, vol. 19, No. 5, 47/486; K. J. Astrom (1983).
A Survey of Model–Reference Adaptive Techniques; Theory and Applications, Automatica, vol. 10, 353: I. D. Landou (1974).

Primary Examiner—Jerry Smith
Assistant Examiner—Jon D. Grossman
Attorney, Agent, or Firm—Oblon, Fisher, Spivak, McClelland & Maier

[57] ABSTRACT

A process control apparatus has a controller for performing a control operation including an integral operation for a set point signal supplied to a process and an output signal from the process and for generating a control signal to the process, and a reference model which has a desired transfer function of a control system and which receives the set point signal. The process control apparatus further has a first subtractor for subtracting the output signal of the reference model from the output signal of the process, an output error compensator for performing a control operation including an integral operation for the output error and for generating a compensation signal in such a manner that the output error becomes zero, and a second subtractor for subtracting the compensation signal from the output control signal of the controller.

6 Claims, 10 Drawing Figures

DYNAMIC ERROR COMPENSATING PROCESS CONTROLLER

BACKGROUND OF THE INVENTION

The present invention relates to a process control apparatus and, more particularly, to a process control apparatus for controlling a process whose dynamic characteristic changes.

In order to control a temperature, a pressure, a flow rate or the like of a plant, control parameters of the process control apparatus should be properly set in accordance with the dynamic characteristic of the plant to be controlled. When the control parameters do not correspond to the dynamic characteristic, an oscillation in the process control loop of the plant may occur and part or all of the plant may be destroyed. An operation environment for the plant during operation changes in accordance with a tendency of energy conservation. For example, the plant is operated with energy conservation, so that the dynamic characteristic of the plant often changes greatly.

There are two types of conventional control apparatuses: one is an apparatus in which control parameters are fixed during the operation of the plant; and the other is an apparatus in which the control parameters are tuned by detecting the dynamic characteristic during the operaton. In the former apparatus, the control parameters fall within a safety range in consideration of the worst conditions. However, when the change in the dynamic characteristic is greater than the expected value, the control characteristics are degraded. In order to prevent this, the latter apparatus is proposed to tune the control parameters during the operation. This process control apparatus is classified into two types in the following manner.

Figure 1:
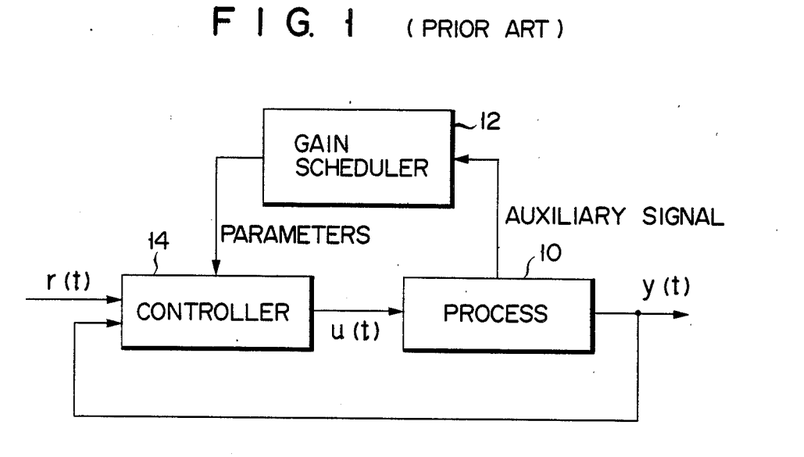
FIG. 1 is a block diagram of a conventional gain schedule process control apparatus.

When a relationship between the cause and effect of a change in the dynamic characteristic (i.e., a relationship between a cause of a change in the dynamic characteristic and the resultant dynamic characteristic) is known, a gain schedule control system is used, as shown in FIG. 1. In this system, an auxiliary signal directly related to a change in a dynamic characteristic is generated from a process 10 and is supplied to a gain scheduler 12. The control parameters are calculated in accordance with a gain schedule curve stored therein. The control parameters are then supplied to a controller 14. The controller 14 controls a control signal u(t) such that a process output signal y(t) becomes equal to a set point signal r(t).

Figure 2:
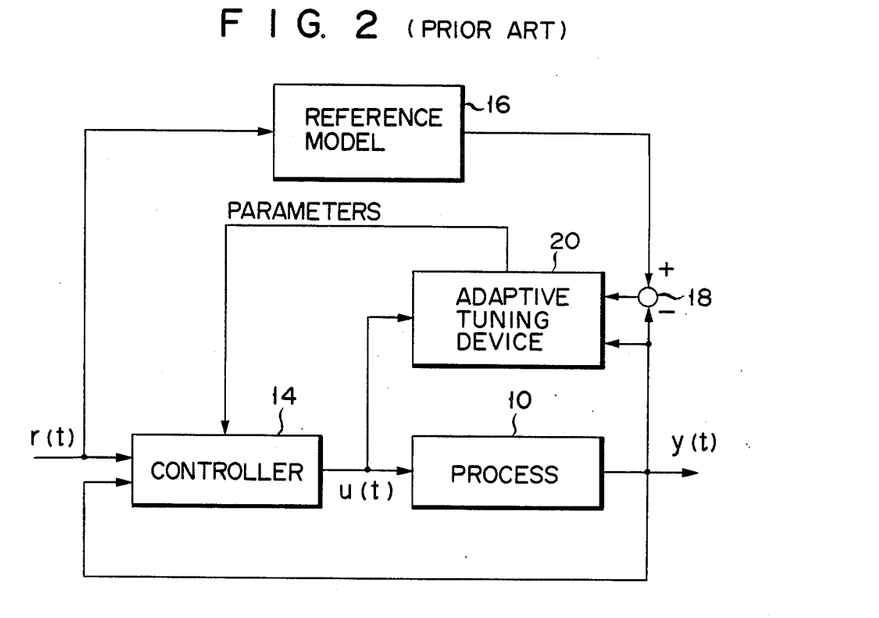
FIG. 2 is a block diagram of a conventional model reference adaptive process control apparatus.

However, when the relationship between the cause and effect is unknown, a model reference adaptive control system shown in FIG. 2 is used. This system has a process 10 and a reference model 16. A set point signal r(t) is supplied to the reference model 16 as well as to a controller 14. An error, i.e., an output error between the outputs from the process 10 and the reference model 16, is calculated by a subtractor 18. An adaptive tuning device 20 determines the control parameters of the controller 14 in such a manner that the output error becomes zero.

These two conventional control systems are summarized as follows. The gain schedule control system can be used only when the relationship between the cause and effect of the change in the dynamic characteristic of the process 10 is known and the auxiliary process signal directly related to the change in the dynamic characteristic can be detected. Therefore, this system cannot be used when the dynamic characteristic of the process 10 is unknown, resulting in inconvenience. On the other hand, the model reference adaptive control system can be used even if the dynamic characteristic of the process 10 is unknown. However, it takes a long time for this system to tune the control parameters of the controller 14 in accordance with the dynamic characteristic of the process 10. In addition, when the process 10 is a nonminimum process, it is difficult to control based on the reference model 16. When unknown disturbance or measuring noise is present, the adaptive tuning device 20 erroneously detects a change in the dynamic characteristic. As a result, the control parameters of the controller 14 are erroneously changed. This problem has not been solved until now.

These conventional process control systems for tuning the control parameters during the operation of the process are highly sensitive. The sensitivity of the control system is defined as follows. When the dynamic characteristic of the process changes from $G_p(s)$ to $\tilde{G}_p(s)$ $(=G_p(s)+\Delta G_p(s))$, and the transfer function $(y(t)/r(t))$ in FIGS. 1 and 2) of the control system as a whole changes from $T(s)$ to $\tilde{T}(s)$ $(=T(s)+\Delta T(s))$, the sensitivity $S(s)$ is given by $$S(s) = (\Delta T(s)/\tilde{T}(s))/(\Delta G_p(s)/\tilde{G}_p(s)) \tag{1}$$

Equation (1) indicates how a change in the process to be controlled influences the control system. The smaller the sensitivity becomes, the less the degradation of control performance of the control system, with respect to the change $\Delta G_p(s)$ in the process, becomes. On the contrary, a control system of high sensitivity is defined as a system in which the transfer function of the control system as a whole greatly changes in accordance with a change in a dynamic characteristic of the process. A change in a transfer function of the control system degrades the control characteristic of the control system. A control system of low sensitivity is defined as a robust control system in which the transfer function of the control system as a whole does not change, thus preventing degradation of the control performance even if the dynamic characteristic of the process to be controlled changes.

SUMMARY OF THE INVENTION

It is an object of the present invention to provide a robust process control apparatus wherein a transfer function of the control system as a whole does not change, thus preventing degradation of the control performance even if the dynamic characteristic of the process to be controlled changes.

In order to achieve the above object of the present invention, there is provided a process control apparatus comprising a controller for performing a control operation including an integral operation for a set point signal to a process and an output signal from the process, a reference model having a desired transfer function of a control system and receiving the set point signal, a first subtractor for subtracting the output signal of the reference model from the output signal of the process to obtain an output error, an output error compensator for performing a control operation including an integral operation for the output error from the first subtractor and for generating a compensation signal such that the output error becomes zero, and a second subtractor for subtracting the output signal of the output error compensator from the output of the controller and for supplying a subtraction result as a control signal to the process.

DETAILED DESCRIPTION OF THE PREFERRED EMBODIMENTS

Figure 3:
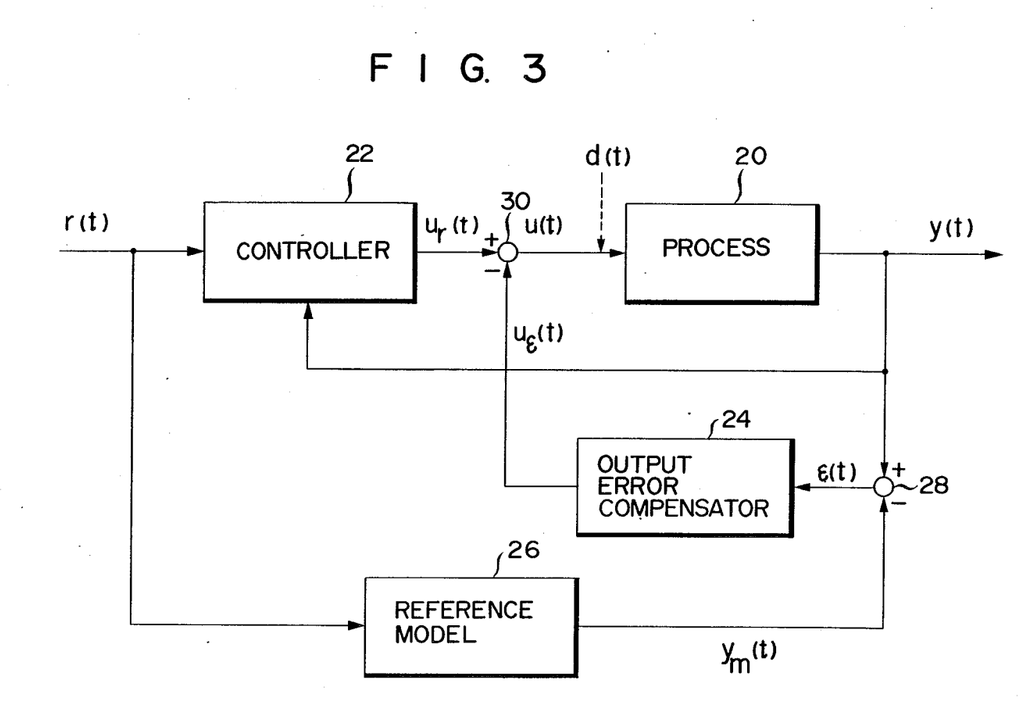
FIG. 3 is a block diagram of a process control apparatus according to a first embodiment of the present invention.

A process control apparatuses according to the preferred embodiments will be described below with reference to the accompanying drawings. FIG. 3 is a block diagram showing the principle of a process control apparatus according to a first embodiment of the present invention. A controller (main compensator) 22 is connected to the input terminal of a process 20 to be controlled. An output signal y(t) from the process 20 and its set point signal r(t) are supplied to the controller 22. The controller 22 performs a control operation including an integral operation for the signals y(t) and r(t) and generates a signal $u_r(t)$. A reference model 26 has a stable or desirable transfer function of the entire control system which is used in designing the control system. The set point signal r(t) is supplied to the reference model 26. The output y(t) from the process 20 and an output $y_m(t)$ from the reference model 26 are supplied to a first subtractor 28, which calculates an output error $\epsilon(t)$ $(=y(t)-y_m(t))$. The output error $\epsilon(t)$ is supplied to an output error compensator 24. The output error compensator 24 performs a control operation including an integral operation for the output error $\epsilon(t)$ and generates an output error compensation signal $u_\epsilon(t)$ to nullify the output error $\epsilon(t)$. The output $u_r(t)$ from the controller 22 and the output error compensation signal $u_\epsilon(t)$ from the output error compensator 24 are supplied to a second subtractor 30. The second subtractor 30 substracts the output error compensation signal $u_\epsilon(t)$ of the output error compensator 24 from the output $u_r(t)$ of the controller 22 and generates a control signal u(t) to be supplied to the process 20. A disturbance d(t) is often superposed on the control signal u(t).

In this control system, the process 20 is properly controlled by the controller 22 in the normal operation of the process 20. During this stable operation, the reference model 26 has a stable transfer function from the set point signal r(t) to the output signal y(t) from the process 20. Therefore, in this state, the output error $\epsilon(t)$ is zero. However, when the disturbance d(t) is applied to the control signal u(t) or the dynamic characteristic of the controller 22 changes, a non-zero output error $\epsilon(t)$ is generated. The output error compensator 24 calculates an expected value of the disturbance d(t) in accordance with the output error $\epsilon(t)$ and generates a signal $u_\epsilon(t)$ to compensate for the disturbance (the expected value). Therefore, the apparatus of this embodiment has high reliability with respect to the disturbance as compared with the conventional apparatus. Since the output from the output error compensator 24 is fed back to the process input, the control signal u(t) can be immediately tuned by the output error compensator 24 in accordance with the change in the dynamic characteristic before the regulation function of the controller 22 is effected, even if the output error $\epsilon(t)$ is generated. In other words, a change in the dynamic characteristic of the process can be immediately compensated for. The apparatus has low sensitivity, i.e., it becomes robust as compared with the conventional control apparatus. Since it is the output error compensator 24 that makes the control system more robust, the output error compensator 24 will be called a robust compensator 24 hereafter.

According to the first embodiment described above, the set point signal r(t) is actually supplied to the reference model 26 having a stable transfer function (for the control system as a whole) which is used in the design of the control system. The output from the reference model 26 is subtracted from the actual output y(t) from the process 20 to obtain the output error $\epsilon(t)$. The output error $\epsilon(t)$ is then subjected to a compensation operation including the integral operation to obtain an expected value of the disturbance. The compensation signal $u_\epsilon(t)$ to nullify the output error $\epsilon(t)$ is calculated in accordance with the expected value. The compensation signal $u_\epsilon(t)$ is negatively fed back by the control signal u(t) to the process 20, thereby achieving a robust process control apparatus which is not influenced by the change in a dynamic characteristic and a disturbance. Since the control system is thus robust against a change in a dynamic characteristic, the gain schedule need not be performed. In addition, the control parameters of the controller need not be tuned. As a result, a simple process control apparatus can be obtained.

Figure 4:
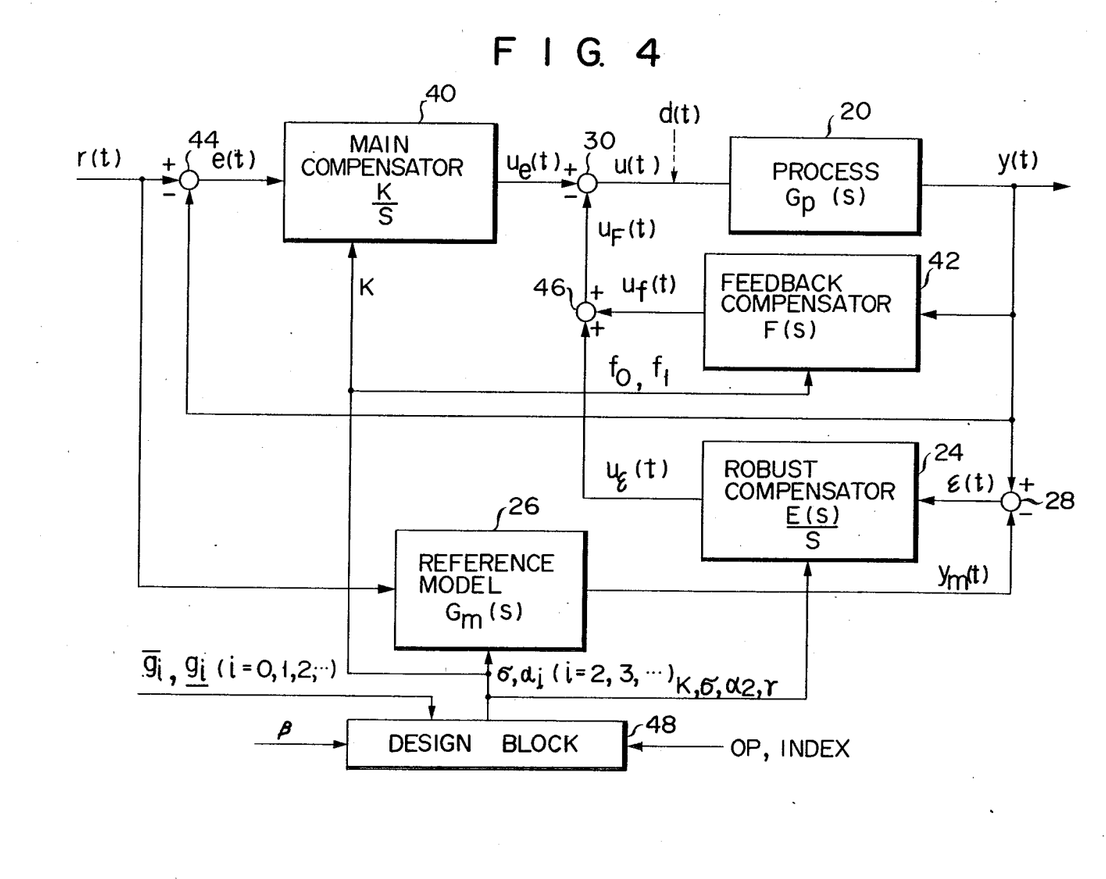
FIG. 4 is a block diagram of a process control apparatus according to a second embodiment of the present invention.

A second embodiment of the present invention will be described with reference to FIG. 4. The same reference numerals in the second embodiment denote the same parts as in the first embodiment. The second embodiment is exemplified by an I-PD control system. A main compensator (I control) 40 and a feedback compensator (PD control) 42 are arranged in place of the controller 22 of the first embodiment. In the second embodiment, a transfer function of a reference model 26 is not predetermined but is instead determined by a design block 48. The transfer function of the process 20 is given as $G_p(s)$ $(=y(t)/u(t))$. A process output signal y(t) and a set point signal r(t) are supplied to a subtractor 44 to produce a control deviation e(t) $(=r(t)-y(t))$. The main compensator 40 receives the control deviation e(t) and performs the following operation to produce a signal $u_e(t)$ $$u_e(t) = (K/s)e(t) \tag{2}$$

where K is the integral gain.

The feedback compensator 42 receives the process output y(t) and performs a proportional.differential operation to produce a signal $u_f(t)$ $$u_f(t) = F(s)y(s) \quad (3)$$

$$\text{for } F(s) = f_0 + f_1 s + f_2 s^2 \ldots \quad (4)$$

The reference model 26 receives the set point signal r(t) and generates a model output $y_m(t)$ $$y_m(t) = G_m(s)r(t) \quad (5)$$

$$\text{for } G_m(s) = 1/\sigma^{(n)}(s) \quad (6)$$

$$= 1/(1 + \sigma s + \alpha_2(\sigma s)^2 + \ldots + \alpha_n(\sigma s)^n)$$

The subtractor 28 subtracts the model output $y_m(t)$ from the process output y(t) and generates an output error signal $\epsilon(t)$ $$\epsilon(t) = y(t) - y_m(t) \quad (7)$$

The robust compensator (the output compensator) 24 receives the output error signal $\epsilon(t)$ and performs the following integral operation to produce a signal $u_\epsilon(t)$ $$u_\epsilon(t) = (E(s)/s)\epsilon(t) \quad (8)$$

$$\text{for } E(s) = K(1 + \sigma s + \alpha_2(\sigma s)^2)\gamma \quad (9)$$

where $\gamma$ is a proportionalability constant which will be referred to as a robust gain hereafter. An adder 46 adds the output $u_\epsilon(t)$ from the robust compensator 24 and the output $u_f(t)$ from the feedback compensator 42 and generates a signal $u_F(t)$ $$u_F(t) = u_f(t) + u_\epsilon(t) \quad (10)$$

The output $u_F(t)$ from the adder 46 is subtracted by a subtractor 30 from the output $u_c(t)$ from the main compensator 40 to produce a control signal u(t) which is supplied to the process 20

$$u(t) = u_c(t) - u_F(t) \quad (11)$$

The reference model 26 has transfer function having a general formula using $\sigma$ and $\alpha_i (i=2, 3, \ldots)$ as parameters. These parameters are determined by the design block 48. The upper and lower limit values of the transfer function $G_p(s)$ of the process 20 are supplied to the disign block 48. When the transfer function $G_p(s)$ is expressed as a denominator series expression as follows $$G_p(s) = 1/(g_0 + g_1 s + g_2 s^2 + g_3 s^3 + \ldots) \quad (12)$$

the upper and lower limit values $\overline{g_i}$ and $\underline{g_i}$ of a denominator $g_i (i=0, 1, \ldots)$ are supplied to the design block 48. The design block 48 receives the upper limit value $\overline{g_i}$, the lower limit value $\underline{g_i}$, the response shape coefficient $\beta$, and an operation condition coefficient $OP_{index}$ and calculates $\alpha_i (i=2, 3, \ldots)$, $\sigma$, K, $f_0$, $f_1$ and the robust gain $\gamma$ $$\alpha_2 = (1/2)\beta + (3/8)(1-\beta) \quad (13)$$

$$\alpha_3 = (3/20)\beta + (1/18)(1-\beta) \quad (14)$$

$$\alpha_4 = (3/100)\beta + (1/258)(1-\beta) \quad (15)$$

Other parameters are calculated in accordance with the operation condition coefficient $OP_{index}$.

(1) When the operation condition coefficient $OP_{index}$ is given for the I operation $$\sigma = (1/\alpha_2) \cdot \text{Min}[\overline{g_1}/\underline{g_0}, \underline{g_1}/\overline{g_0}] \quad (16)$$

$$K = (1/\sigma) \cdot \text{Min}[\overline{g_0}, \underline{g_0}] \quad (17)$$

where Min[x,y] indicates a smaller value of x and y.

(2) When the operation condition coefficient $OP_{index}$ is given for the I-P operation $$\sigma = (\alpha_2/\alpha_3) \cdot \text{Min}[\overline{g_2}/\underline{g_1}, \underline{g_2}/\overline{g_1}] \quad (18)$$

$$K = (1/\alpha_2\sigma^2) \cdot \text{Min}[\overline{g_1}, \underline{g_1}] \quad (19)$$

$$f_0 = \sigma K - \text{Min}[\overline{g_0}, \underline{g_0}] \quad (20)$$

(3) When the operation condition coefficient $OP_{index}$ is given for the I-PD operation $$\sigma = (\alpha_3/\alpha_4) \cdot \text{Min}[\overline{g_3}/\underline{g_2}, \underline{g_3}/\overline{g_2}] \quad (21)$$

$$K = (1/\alpha_3\sigma^3) \cdot \text{Min}[\overline{g_2}, \underline{g_2}] \quad (22)$$

$$f_0 = \sigma K - \text{Min}[\overline{g_0}, \underline{g_0}] \quad (23)$$

$$f_1 = \alpha_2\sigma^2 K - \text{Min}[\overline{g_1}, \underline{g_1}] \quad (24)$$

The design block 48 receives smaller values of the sets of parameters of the denominator series of the upper and lower limit values of the transfer function so as to calculate the respective parameters. However, the design block 48 may receive the mean or larger values instead of the smaller ones. When smaller values are used, the control system can be stabilized within the range of changes in a dynamic characteristic. In this sense, a robust gain $\gamma$ which falls as low as, for example, about 5 to 10 can be selected to prevent the control system from an unstable operation.

The design of control model will be described hereafter. It is known that the transfer function of the process 20 has the upper limit value $\overline{G_p(s)}$ and the lower limit value $\underline{G_p(s)}$ expressed by $$\overline{G_p(s)} = 1/(1 + 13s + 32s^2 + 20s^3) \quad (25)$$

$$\underline{G_p(s)} = 1/(5 + 65s + 160s^2 + 100s^3) \quad (26)$$

The process will be considered wherein the transfer function is expressed by Eq. (25). A reference model $G_m(s)$ will be designed when the response shape coefficient $\beta = 0.4$ and the operation condition coefficient $OP_{index}$ is given for the I-PD operation. The values $\sigma = 6.25$, $K = 1.376$, $f_0 = 7.602$ and $f_1 = 10.04$ are derived from Eqs. (21) to (24), respectively to yield the following reference model $$G_m(s) = 1/(1 + \sigma s + (3/7)(\sigma s)^2 + (2/21)(\sigma s)^3 + (1/105)(\sigma s)^4) \quad (27)$$

Figure 5A:
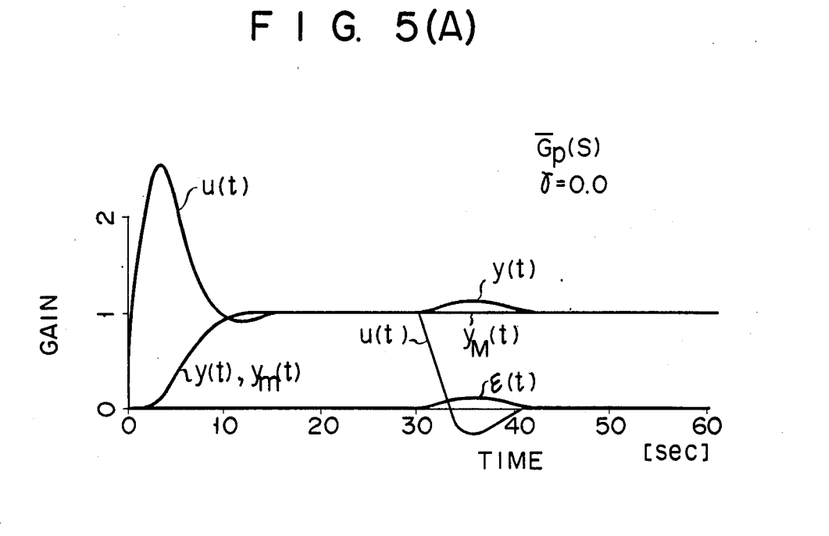
FIGS. 5A and 5B are respectively graphs for explaining the operation of the second embodiment when a robust gain is given as 0.0.
Figure 5B:
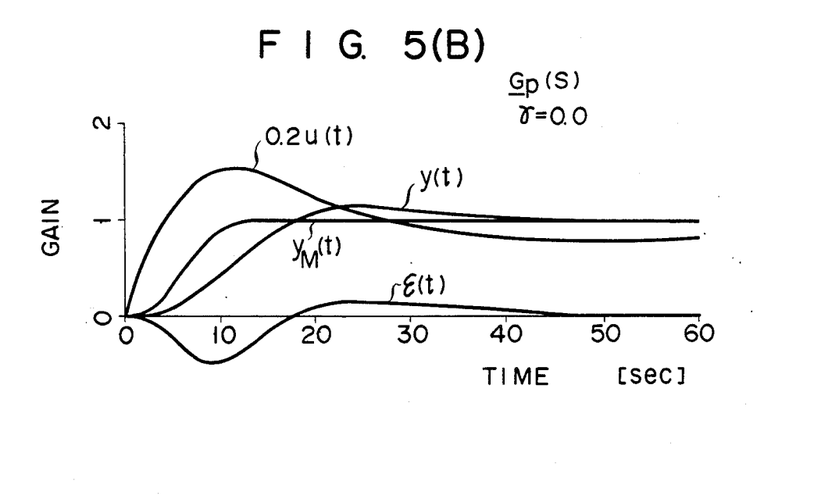
Figure 6A:
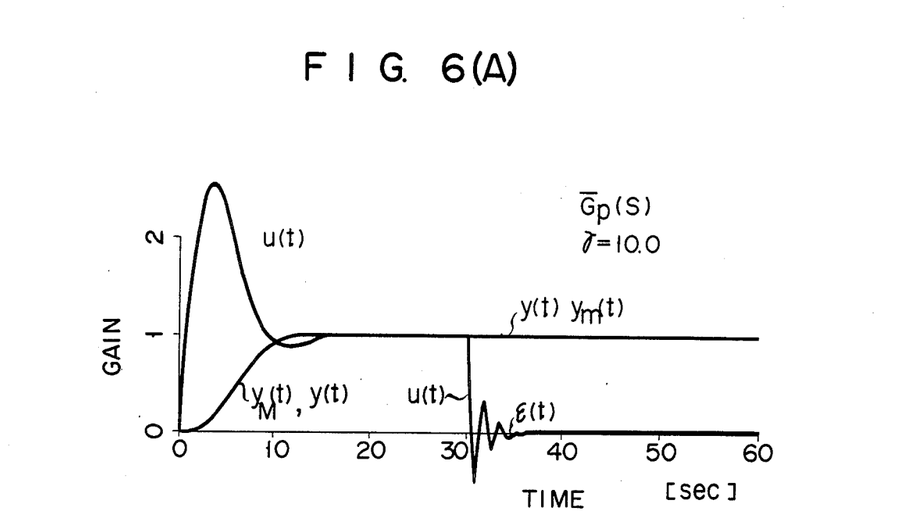
FIGS. 6A and 6B are respectively graphs for explaining the operation of the second embodiment when the robust gain is given as 10.0.
Figure 6B:
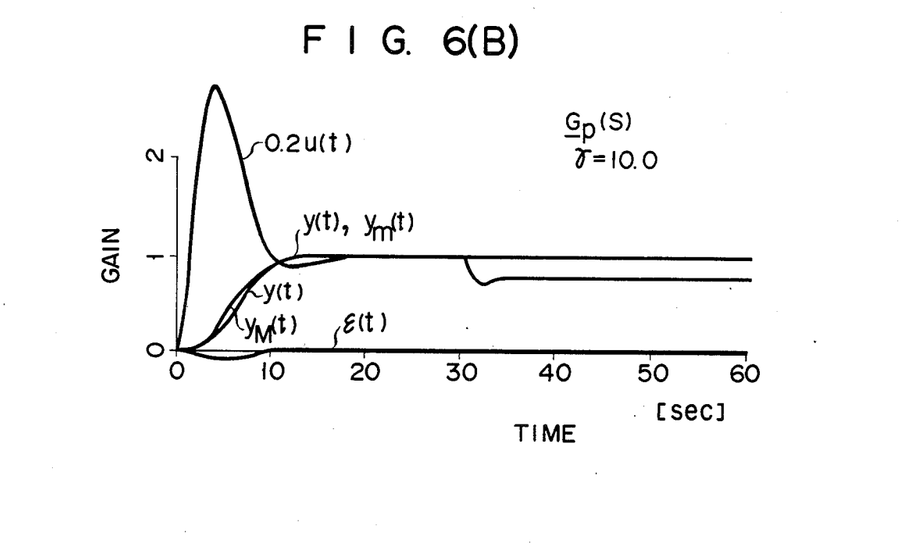

The responses of the control system by using the reference model $G_m(s)$ will be shown in FIGS. 5A and 5B and FIGS. 6A and 6B when the robust gains $\gamma$ are 0.0 and 10.0 respectively. FIGS. 5A and 6A show the case wherein the transfer function of the process 20 is the upper limit values $\overline{G_p(s)}$ expressed by Eq. (25). FIGS. 5B and 6B show the case wherein the transfer function of the process 20 is the lower limit values $\underline{G_p(s)}$ expressed by Eq. (26). The set point signal r(t) changes by a unit step at time t=0.0 and the disturbance d(t) changes by a unit step at time t=30.0 so as to check the control performance.

The control system having the robust gain $\gamma$ of 0.0 shown in FIGS. 5A and 5B comprises a simple I-PD control system. Since the reference model shown in FIG. 5A uses the transfer function $\overline{G_p}(s)$, the response y(t) of the control system coincides with the response $y_m(t)$ of the reference model. However, this I-PD model has lower controllability of disturbance than that of the model shown in FIG. 6A.

On the contrary, in the case of FIG. 5B, the reference model $G_m(s)$ is different from the model $\underline{G_p}(s)$ used in the design. As compared with the case in FIG. 5A, the response y(t) of the control system deviates greatly from the response $y_m(t)$ of the reference model.

In the case of FIG. 6A, the reference model is $G_p(s)$, so that the response y(t) of the control system coincides with the response $y_m(s)$ of the reference model. The controllability of the disturbance is better than that in FIG. 5A. In the case of FIG. 6B, since the robust gain $\gamma$ is as high as 10.0, the response y(t) of the control system is the same as the response $y_m(t)$ of the reference model. In addition, the controllability of the disturbance is better than that in FIG. 5B.

According to the second embodiment, the robust gain $\gamma$ becomes large enough not to cause the control system to oscillate. Even if the gain schedule or the adaptive control is not performed, the apparatus has low sensitivity (robust) for a change in a dynamic characteristic of the process. The control apparatus has good controllability of the disturbance. As a result, a good control system is obtained wherein the dynamic characteristic from the set point value to the output signal is approximated to the dynamic characteristic of the reference model.

Figure 7:
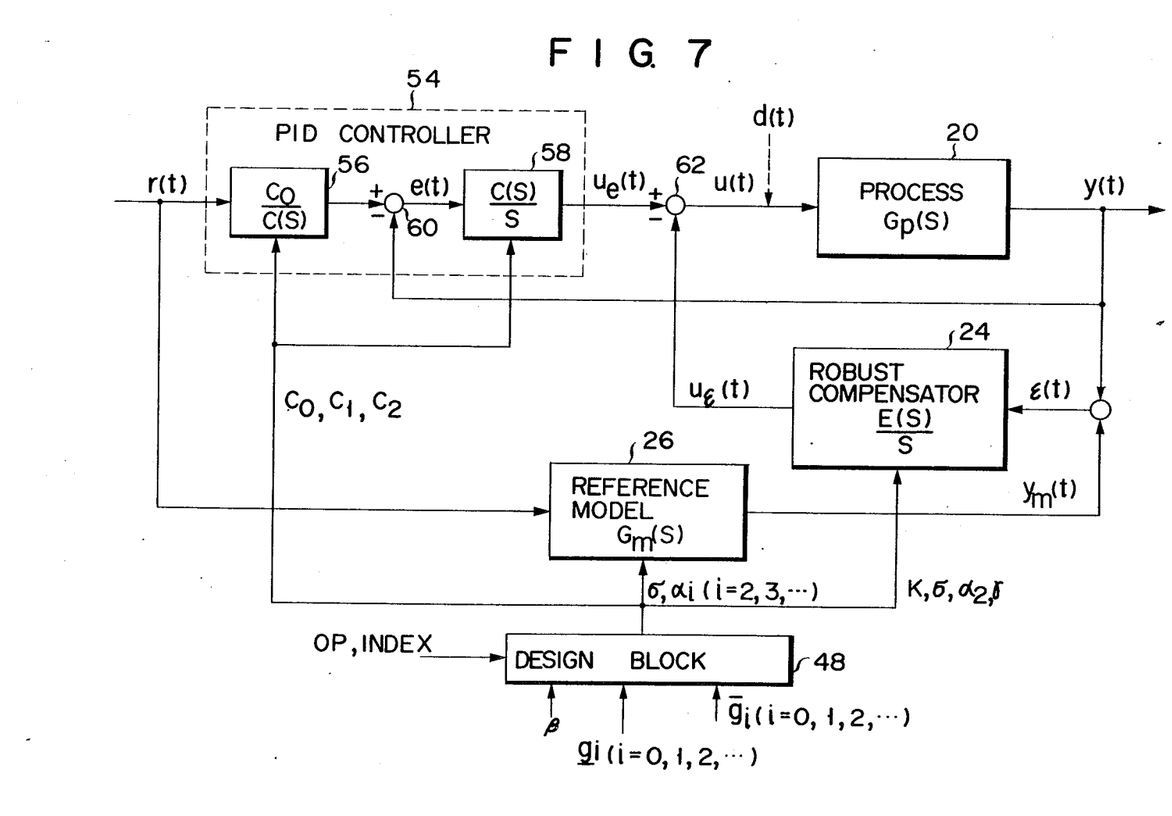
FIG. 7 is a block diagram of a process control apparatus according to a third embodiment of the present invention.

The second embodiment is exemplified by the robust control apparatus in accordance with the I-PD control system. However, the robust control apparatus may also be designed in accordance with the PID control system. A PID control system according to a third embodiment is shown in FIG. 7. In the the third embodiment, the main compensator 40 and the feedback compensator 42 are removed from the arrangement of the second embodiment. Instead, a PID controller 54 is connected in the former stage of the process 20. A set point signal r(t) is supplied to the PID controller 54. An output $u_\epsilon(t)$ from a robust compensator 24 is subtracted by a subtractor 62 from an output $u_c(t)$ from the PID controller 54. An output u(t) from the subtractor 62 is supplied as a control signal to a process 20. The PID controller 54 comprises a proportional.differential element 56, a subtractor 60 for subtracting the output y(t) of the process 20 from the output of the proportional.-differential element 56, and an integral element 58 which receives the output e(t) from the subtracter 60. The c(s) defining the respective elements of the PID controller 54 in the third embodiment will be given by $$c(s) = c_0 + c_1 s + c_2 s^2 \qquad (28)$$

Terms $c_0$, $c_1$ and $c_2$ in Eq. (28) are equivalent to K, $f_0$ and $f_1$ in Eqs. (9) and (16) to (24).

Figure 8:
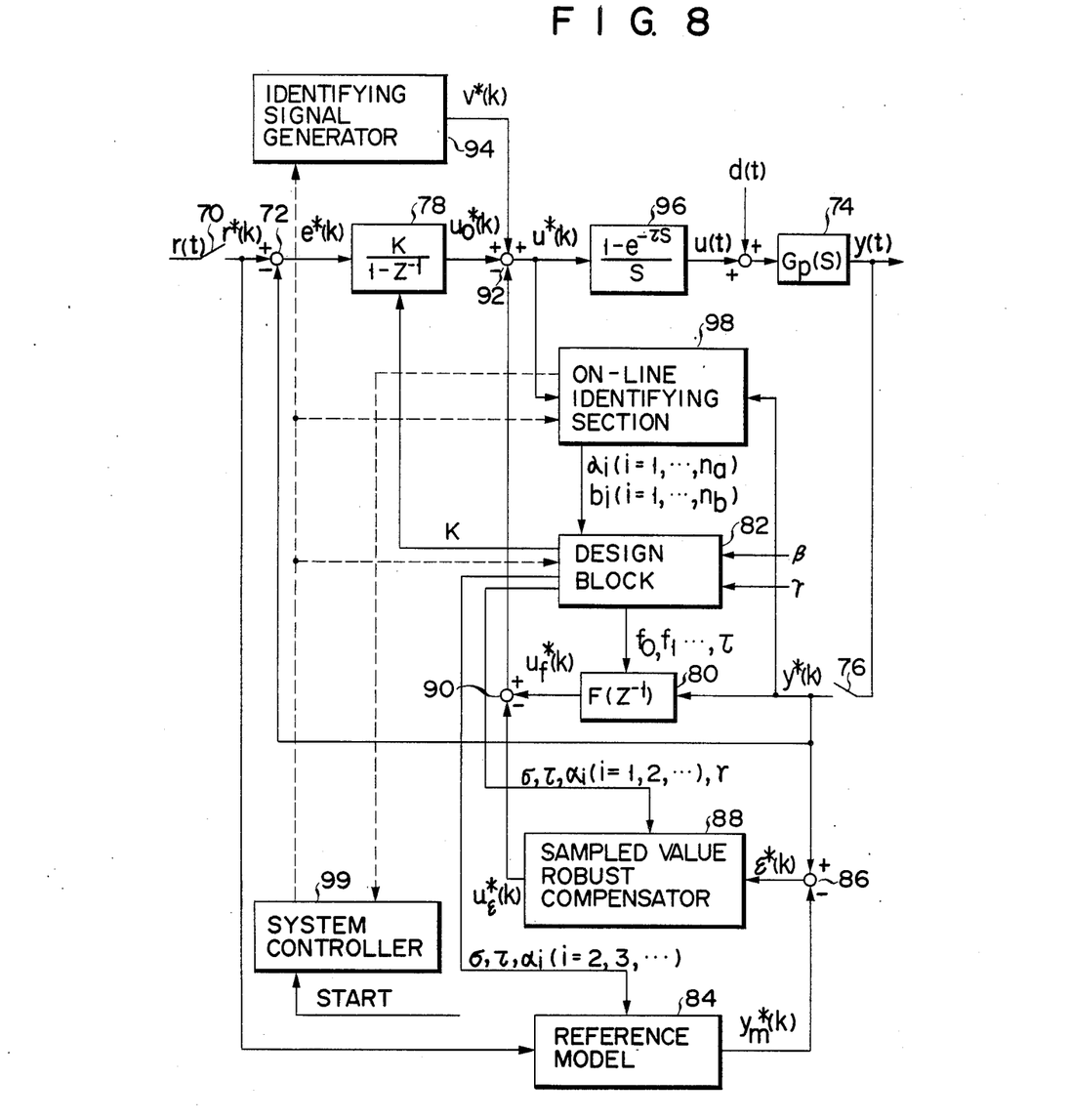
FIG. 8 is a block diagram of a process control apparatus according to a fourth embodiment of the present invention.

A fourth embodiment of the present invention will be described with reference to FIG. 8. In this embodiment, the control system comprises a sampled value I-PD control system. A sampled value PID controller is used as a robust compensator. In the same manner as in the second embodiment, the reference model is designed by a design block. Furthermore, in the fourth embodiment, the parameters are designed by the design block in accordance with the process dynamic characteristic. In other words, the reference model design of the second embodiment is mainly performed by a manual operation. However, the reference model design in the fourth embodiment can be automated in accordance with the process dynamic characteristic. A continuous set point signal r(t) is sampled by a sampler 70 which generates a discrete set point signal r*(k), which is then supplied to a subtractor 72. A continuous output y(t) from a process 74 is sampled by a sampler 76 synchronized with the sampler 70 and is converted to a discrete process output y*(k). The discrete process output y*(k) is supplied to a subtractor 72. It should be noted that a sampling period of the samplers 70 and 76 is given as $\tau$, i.e., t=k$\tau$. The subtractor 72 subtracts the process output y*(k) from the set point signal r*(k), and subtracted result is supplied as a control deviation e*(k) to a sampled value I controller 78. The sampled value I controller 78 integrates the control deviation e*(k) by using an integral gain k and generates an integral output $u_0$*(k)

$$u_0^*(k) = u_0^*(k-1) + Ke^*(k) \qquad (29)$$

The process output y*(k) is supplied to a sampled value PD controller 80 and is subjected to the following operation $$u_f^*(k) = F(z^{-1})y^*(k) \qquad (30)$$

$$\text{for } F(z^{-1}) = f_0 + f_1((1-Z^{-1})/\tau) \qquad (31)$$

The parameters $f_0$, $f_1$ and $\tau$ of the sampled value PD controller 80 are determined by a design block 82. A reference model 84 calculates a set point signal r*(k) in accordance with the parameters determined by the design block 82 and generates a model output $y_m$(k)

$$y_m^*(k) = G_m(Z^{-1}, \tau, \sigma, a_2, a_3, \ldots) \qquad (32)$$

A subtractor 86 calculates a difference between the model output $y_m$*(k) and the process output y*(k). The following output error $\epsilon$*(k) is supplied from the subtracter 86 to a robust compensator 88

$$\epsilon^*(k) = y^*(k) - y_m^*(k) \qquad (33)$$

The robust compensator 88 calculates an output error $\epsilon$*(k) by using the respective parameters $\sigma$, $\tau$, $a_i$(i=1, 2, ...) and $\gamma$ determined by the design block 82, thereby producing an output $u_\epsilon$*(k)

$$u_\epsilon^*(k) = H(Z^{-1}, \tau, \sigma, a_2, a_3, \ldots, K, \gamma) \qquad (34)$$

A subtractor 90 subtracts the output $u_\epsilon$*(k) of the robust compensator 88 from the output $u_f$*(k) of the sampled value PD controller 80. An output from the subtracter 90 is supplied to the (−) input terminal of a subtracter 92. The output $u_0$*(k) from the sampled value I controller 78 and an output (persistently exciting signal) v*(k) from an identifying signal generator 94 are supplied to the (+) input terminal of the subtractor 92. The subtracter 92 generates the following sampled value control signal u*(k)

$$u^*(k) = u_0^*(k) + v^*(k) - u_f^*(k) - u_\epsilon^*(k) \qquad (35)$$

The sampled value control signal u*(k) is held by a 0th-order holder 96 during the sampling period $\tau$ and is converted to the following continuous control signal u(t), which is then supplied to the process 74

$$u(t) = ((1 - e^{-\tau s})/S)u^*(k) \qquad (36)$$

In practice, the disturbance d(t) is superposed on the control signal u(t).

The sampled value control signal u*(k) and the sampled value process output y*(k) are supplied to an on-line identifying section 98 to identify the dynamic characteristic of the process 74. More specifically, parameters $a_i$ (i=1, 2, ..., na) and $b_i$ (i=1, 2, ..., nb) are identified by the method of least squares when the process dynamic characteristic is given by $$A(Z^{-1})y^*(k) = B(Z^{-1})u^*(k) \qquad (37)$$

$$A(Z^{-1}) = 1 + a_1 Z^{-1} + \ldots + a_{na} Z^{-na} \qquad (38)$$

$$B(Z^{-1}) = b_1 Z^{-1} + \ldots + b_{nb} Z^{-nb} \qquad (39)$$

The identifying signal generator 94 and the on-line identifying section 98 are controlled by a system controller 99. An identifying start signal START is supplied to the system controller 99.

The operation of the fourth embodiment will be described below. The integral gain K and the feedback parameters $f_0$ and $f_1$ are set within a stable range of the control system. The indentifying start signal START is supplied to the system controller 99. The system controller 99 drives the identifying signal generator 94 and the on-line identifying section 98. In this embodiment, since the persistently exciting signal is applied during the closed loop, the dynamic characteristic of the process in a closed loop can be identified (IEEE transactions on automatic control, December 1976, "Identifiability Conditions for Linear Multivariable Systems Operating Under Feedback", by T. Söderström et al). The on-line identifying section 98 identifies the parameters $a_i$ and $b_i$ of the dynamic characteristic of the process in accordance with the following algorithm $$\overline{\theta}(k) = \overline{\theta}(k-1) + [P(k)\phi(k)\eta(k)/\{\lambda(k) + \phi(k)^T P(k)\phi(k)\}] \qquad (40)$$

for $$P(k) = [P(k-1) - \{(P(k-1)\phi(k)\phi(k)^T P(k-1))/ \qquad (41)$$

$$\{\lambda(k) + \phi(k)^T P(k)\phi(k)\}]/\lambda(k)$$

$$\eta(k) = y(k) - \overline{\theta}(k-1)\phi(k) \qquad (42)$$

$$\overline{\theta} = [a_1, a_2, \ldots, a_{na}, b_1, b_2, \ldots, b_{nb}]^T \qquad (43)$$

$$\phi(k) = [-y^*(k-1), \ldots, -y^*(k-na), \qquad (44)$$

$$u^*(k-1), \ldots, u^*(k-nb)]^T$$

When identification is progressed, the identifying error signal $\eta(k)$ becomes small, and a change in an unknown parameter vector $\overline{\theta}(k)$ is decreased. When these facts are detected by the system controller 99, the system controller 99 causes the identifying signal generator 94 and the on-line identifying section 98 to stop and the design block 82 to start. The parameters as the identified results, are supplied from the on-line identifying section 98 to the design block 82. The response shape parameter $\alpha$ and the robust gain $\gamma$ are manually supplied to the design block 82. The design block 82 calculates the transfer function $G_p(s)$ of the process 74 in the following manner $$G_p(s) = \{(b_1 e^{-\tau s} + \ldots + b_{nb} Z^{-nb\tau s})/ \qquad (45)$$

$$(1 + a_1 e^{-\tau s} + \ldots + a_{na} Z^{-na\tau s})\} \times$$

$$\{d_0 + d_1(\tau s) + d_2(\tau s)^2 + d_3(\tau s)^3 + \ldots\}$$

$$= 1/(g_0 + g_1 s + g_2 s^2 + g_3 s^3 + \ldots)$$

A process model $G_M(s, \sigma, \alpha_2, \alpha_3)$ defined by a response shape coefficient $\beta$ is partially matched by the design block 82 with the transfer function $G_p(s)$ (to be described later), and the design block 82 calculates the integral gain k and the feedback coefficients $f_0$ and $f_1$.

The parameters $\alpha_2$, $\alpha_3$ and $\alpha_4$ are given by $$\alpha_2 = (1/2)\alpha + (3/8)(1-\alpha) \qquad (46)$$

$$\alpha_3 = (3/20)\alpha + (1/16)(1-\alpha) \qquad (47)$$

$$\alpha_4 = (3/100)\alpha + (1/256)(1-\alpha) \qquad (48)$$

The reference model $G_M(s, \sigma, \alpha_2, \alpha_3)$ for designing the control system is defined by $$G_M(s, \sigma, \alpha_2, \alpha_3) = 1/\{1 + \sigma s + \alpha_2(\sigma s)^2 + \alpha_3(\sigma s)^3 + \alpha_4(\sigma s)^4 + \ldots\} \qquad (49)$$

Eq. (49) is subjected to bilinear conversion, and substitution of $S = (2/\tau) \times (1 - Z^{-1})/(1 + Z^{-})$ as the bilinear transformation yields a discrete model $G_M$ $$G_M(Z^-, \tau, \sigma, \alpha_2, \alpha_3) = G_M(s, \sigma, \alpha_2, \alpha_3)|_s \qquad (50)$$

The parameters K, $f_0$ and $f_1$ are calculated by using a minimal solution $\sigma$ of the following equation $$(g_2 + \tau g_1 + \tau^2 g_0)\alpha_4 \sigma^3 + \{-g_3 + (7/12)\tau^2 g_1 + \qquad (51)$$

$$(\tau^2/4)g_0\}\alpha_3 \sigma^2 + \{g_3 - (7/12)\tau g_2 +$$

$$(\tau^3/18)g_0\}\tau\alpha_2\sigma + \{-(1/3)g_3 - (\tau/4)g_2 + (\tau^2/18)g_1\}\tau^2 = 0$$

$$K = \{g_2 + \tau g_1 + (\tau^2/3)g_0/\sigma(\alpha_3\sigma^2 + \tau\alpha_2\sigma + \tau^2/3)\} \qquad (52)$$

$$f_0 = K\sigma - g_0 \qquad (53)$$

$$f_1 = K\alpha_2\sigma^2 + (\tau/2)k\sigma + \{-g_1 - (\tau/2)g_0\} \qquad (54)$$

By using the resultant parameters $\sigma$, $\tau$, $\alpha_i$ (i=1, 2, ...) and $\gamma$, the transfer function of the sampled value PID compensator 88 will be given by $$H(Z^{-1}, \tau, \sigma, K, \gamma) = \{h_0 + h_1(1 - Z^{-1})/\tau + \qquad (55)$$

$$h_2(1 - Z^{-1})2/\tau^2\}/\{(1 - Z^{-1})/\tau\}$$

therefore, $$h_0 = K\gamma \qquad (56)$$

$$h_1 = K\gamma\sigma \qquad (57)$$

$$h_2 = K\gamma\alpha_2\sigma^2 + (\tau/2)h_1 \qquad (58)$$

According to this embodiment, the dynamic characteristic of the process 74 is identified by the on-line identifying section 98 during the process operation. The reference model is designed in accordance with the identification result, so that the robust process control apparatus can be automatically constituted. In the fourth embodiment, the control system may comprise a PID control system.

As has been described in detail according to the present invention, the output error compensator (the robust compensator) is arranged in addition to the main compensator, and the operational speed of the output error compensator is higher than that of the main compensator. The difference between the process output caused by a change in the process dynamic characteristic and the model output is compensated for by the output error compensator. Therefore, a process control apparatus is obtained wherein the control signal can be tuned within a short period of time in accordance with the process dynamic characteristic. As a result, the gain schedule need not be used. The control parameters of the control apparatus need not be continuously controlled, thereby obtaining a simple control apparatus.

What is claimed is:

1. A process control apparatus comprising:
   controller means for performing a control operation including an integral operation for a set point signal supplied to a process and an output signal from the process;
   a reference model having a desired transfer function of a control system including said process and said controller means and receiving the set point signal;
   first subtracting means for subtracting an output signal of the reference model from the output signal of said process to obtain an output error;
   output error compensating means for performing control operation including an integral operation for an output error generated from said first subtracting means and for generating a compensation signal such that the output error becomes zero; and
   second subtracting means for subtracting an output of said output error compensating means from an output of said controller means and for supplying a subtraction result as a control signal to said process.

2. An apparatus according to claim 1, in which said apparatus further comprises designing means, connected to said controller means, said output error compensating means, and said reference model, for determining parameters of said controller means, said output error compensating means and said reference model in accordance with upper and lower limit values of a dynamic characteristic of the process to be controlled and a response shape coefficient of the control system.

3. An apparatus according to claim 2, in which said apparatus further comprises on-line identifying means for identifying the dynamic characteristic of the process to be controlled in accordance with said control signal input to said process and said output signal from said process and said designing means determines the parameters in accordance with an identification result of said on-line identifying means.

4. An apparatus according to claim 1, in which said controller means comprises an I-PD controller.

5. An apparatus according to claim 1, in which said controller means comprises a PID controller.

6. An apparatus according to claim 1, in which said output error compensating means comprises a sampled value PID controller.

* * * * *